United States Patent
Hellgren

(10) Patent No.: US 8,949,447 B2
(45) Date of Patent: Feb. 3, 2015

(54) OPTIMIZED INTERFACE BETWEEN TWO NETWORK ELEMENTS OPERATING UNDER AN AUTHENTICATION, AUTHORIZATION AND ACCOUNTING PROTOCOL

(75) Inventor: Vesa Pauli Hellgren, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 104 days.

(21) Appl. No.: 13/256,240

(22) PCT Filed: Apr. 1, 2009

(86) PCT No.: PCT/EP2009/053885
§ 371 (c)(1),
(2), (4) Date: Sep. 13, 2011

(87) PCT Pub. No.: WO2010/112069
PCT Pub. Date: Oct. 7, 2010

(65) Prior Publication Data
US 2012/0005356 A1    Jan. 5, 2012

(51) Int. Cl.
G06F 15/16 (2006.01)
H04L 29/06 (2006.01)
H04M 15/00 (2006.01)
(52) U.S. Cl.
CPC .............. H04L 63/20 (2013.01); H04M 15/66 (2013.01)
USPC ........................................................ 709/229
(58) Field of Classification Search
CPC ........................................................ H04L 12/14
USPC .................................................. 709/229, 228
See application file for complete search history.

(56) References Cited

U.S. PATENT DOCUMENTS

| | | | | |
|---|---|---|---|---|
| 6,621,979 B1 * | 9/2003 | Eerenberg et al. | ............ | 386/346 |
| 7,889,650 B2 * | 2/2011 | Duan | ............ | 370/230 |
| 8,005,087 B2 * | 8/2011 | Dolganow et al. | ............ | 370/392 |
| 8,086,216 B2 * | 12/2011 | Feder et al. | ............ | 455/405 |
| 8,116,728 B2 * | 2/2012 | Cai et al. | ............ | 455/406 |
| 8,155,020 B2 * | 4/2012 | Giaretta et al. | ............ | 370/252 |
| 8,185,637 B2 * | 5/2012 | Belling | ............ | 709/227 |
| 8,209,730 B2 * | 6/2012 | Hardacker et al. | ............ | 725/90 |
| 8,249,551 B2 * | 8/2012 | Jones et al. | ............ | 455/406 |
| 8,451,764 B2 * | 5/2013 | Chao et al. | ............ | 370/312 |
| 8,649,668 B2 * | 2/2014 | Moorer | ............ | 386/343 |
| 2003/0231863 A1 * | 12/2003 | Eerenberg et al. | ............ | 386/68 |
| 2005/0289619 A1 * | 12/2005 | Melby | ............ | 725/95 |

(Continued)

FOREIGN PATENT DOCUMENTS

EP    1772990 A1    4/2007

OTHER PUBLICATIONS

International Search Report and Written Opinion corresponding to International Application No. PCT/EP2009/053885 dated Feb. 4, 2010.

(Continued)

Primary Examiner — Kevin Bates
Assistant Examiner — Clarence D McCray
(74) Attorney, Agent, or Firm — Squire Patton Boggs (US) LLP

(57) ABSTRACT

According to several embodiments of the present invention, a single session according to an authentication, authorization and accounting protocol, with a network element carrying out a policy and charging rule function is created, wherein the specific session may be used to manage and/or report policy and/or charging control rules.

27 Claims, 7 Drawing Sheets

(56) References Cited

U.S. PATENT DOCUMENTS

| | | | |
|---|---|---|---|
| 2007/0066286 A1* | 3/2007 | Hurtta | 455/414.1 |
| 2008/0229385 A1* | 9/2008 | Feder et al. | 726/1 |
| 2008/0253368 A1* | 10/2008 | Rasanen | 370/389 |
| 2008/0256251 A1* | 10/2008 | Huotari et al. | 709/229 |
| 2009/0141625 A1* | 6/2009 | Ghai et al. | 370/230 |
| 2010/0067400 A1* | 3/2010 | Dolganow et al. | 370/253 |
| 2010/0094950 A1* | 4/2010 | Zuckerman et al. | 709/213 |
| 2010/0094962 A1* | 4/2010 | Zuckerman et al. | 709/219 |
| 2010/0094965 A1* | 4/2010 | Zuckerman et al. | 709/219 |
| 2010/0110961 A1* | 5/2010 | Chao et al. | 370/312 |
| 2012/0005356 A1* | 1/2012 | Hellgren | 709/229 |
| 2012/0011267 A1* | 1/2012 | Ma et al. | 709/231 |
| 2012/0096177 A1* | 4/2012 | Rasanen | 709/228 |
| 2012/0215931 A1* | 8/2012 | Touati et al. | 709/229 |
| 2013/0132462 A1* | 5/2013 | Moorer | 709/203 |
| 2014/0129013 A1* | 5/2014 | Ochi et al. | 700/94 |

OTHER PUBLICATIONS

3rd Generation Partnership Project; Technical Specification Group Core Network and Terminals; Policy and Charging Control over Gx reference point (Release 8), 3GPP TS 29.212 v. 8.3.0, XP002565493, Mar. 18, 2009, pp. 1-80.

3rd Generation Partnership Project; Technical Specification Group Services and System Aspects; Policy and charging control architecture (Release 9), 3GPP TS 23.203, V.9.0.0, XP002565492, Mar. 16, 2009, pp. 1-113.

* cited by examiner

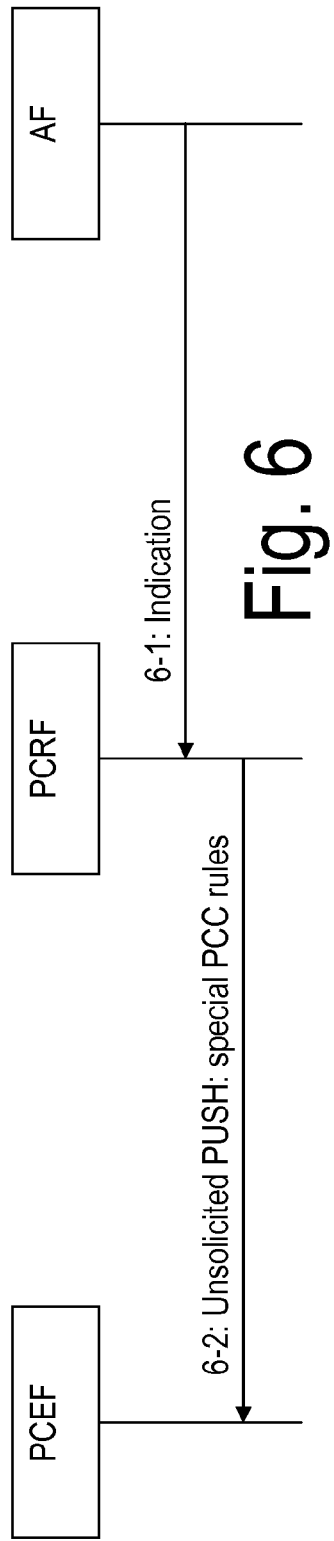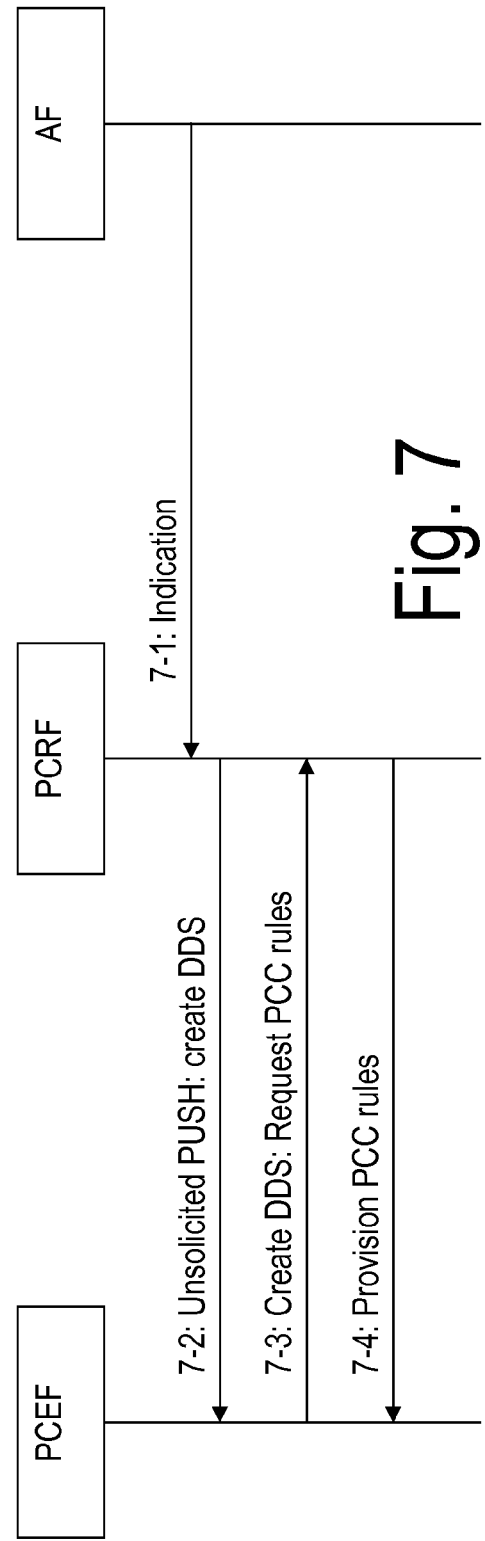

OPTIMIZED INTERFACE BETWEEN TWO NETWORK ELEMENTS OPERATING UNDER AN AUTHENTICATION, AUTHORIZATION AND ACCOUNTING PROTOCOL

FIELD OF THE INVENTION

The present invention relates to an apparatus, method and computer program product for reducing signaling in an interface between two network elements operating under an authentication, authorization and accounting protocol, for example in a Gx interface.

RELATED BACKGROUND ART

The following meanings for the abbreviations used in this specification apply:
3GPP: 3rd generation partnership project
AAA: Authentication, Authorization, Accounting
AF: Application Function
AN: Access network
AVP: Attribute Value Pair
CCR: Credit Control Request
CCA: Credit Control Answer
DDS: Dedicated Diameter Session for IP-CAN bearer/session
GGSN: Gateway GPRS Support Node
GTP: GPRS Tunnelling Protocol
Gx: Name of interface between PCEF and PCRF
HSS: Home Subscriber Server
IMS: IP multimedia subsystem
IP: Internet Protocol
IP-CAN: Internet Protocol Connectivity Access Network
LTE: Long Term Evolution
MME: Mobility Management Entity
QCI: QoS Class Identifier
QoS: Quality of Service
PCC: Policy and Charging Control
PCEF: Policy and Charging Enforcement Function
PCRF: Policy and Charging Rule Function
PDN: Packet Domain Network
P-GW: PDN Gateway
RAR: Re-Authorization Request
RAA: Re-Authorization Answer
RAT: Radio Access Technology
SGSN: Serving GPRS Support Node
S-GW: Serving Gateway
SIP: Session Initiation Protocol Examples of the present invention are related to the Gx interface, which is part of the 3GPP/LTE PCC (policy and charging control) architecture, as shown in FIG. 8 (corresponding to FIG. 5.1.1 from 3GPP 23.203).

In particular, reference number 1 denotes a subscription profile repository (SPR) in which subscription profiles are stored. Reference number 2 denotes an application function (AF). Reference number 3 denotes a policy and charging rules function (PCRF). The PCRF is a functional element that encompasses policy control decision and flow based on charging control functionalities. Reference number 4 denotes a bearer binding and event reporting function (BBERF). The BBERF is a functional element located in the serving gateway (S-GW) and provides control over the user plane traffic handling and other functionalities, such as bearer handling etc. Reference number 5 denotes an online charging system (OCS), which also comprises a service data flow based credit control 51. Furthermore, reference number 6 denotes a gateway, in which a policy and charging enforcement function (PCEF) 61 is provided. The PCEF encompasses policy enforcement and flow based charging functionalities. In particular, it provides control over the user plane traffic handling at the gateway and provides service data flow detection accounting as well as online and offline charging interactions. Reference number 7 denotes an offline charging system (OFCS).

Between the elements described above, several reference points are defined. Between the SPR and the PCRF the Sp reference point is defined, via which the PCRF my obtain information such as subscriber and service related data. Between the AF 2 and the PCRF, the Rx reference point is defined, via which the PCRF my obtain information such as session, media and subscriber related information. Between the PCRF and the BBERF, the Gxx reference point is defined, via which the PCRF may obtain bearer related data. Between the PCRF and PCEF the Gx reference point is defined, via which the PCRF may obtain information regarding IP-CAN bearer attributes, request type, subscriber related information and the like from the PCEF. Between the service data flow based credit control 51 of the OCS 5 and the PCEF, the Gy reference point is defined, and between the PCRF and the OFCS, the reference point Gz is defined.

Embodiments of the present invention aim to improve the performance of Gx interface by reducing the amount of signalling performed in the Gx interface. Gx interface is based on Diameter Gx application protocol, which is fairly heavy protocol.

In an example PCRF product, one cluster could handle 4000 messages per second and it could be able to handle 600000 concurrent sessions. An example gateway could have 5 million concurrent sessions. This means that at least 9 PCRF products are required to have 5 million concurrent sessions of single gateway. In past, operators have not been willing to invest lots of money to PCC. On the other hand, most operators are still interested in PCC architecture and they would most likely buy Gx interface provided there is a vendor who can provide cost efficient yet fully functional Gx interface.

In prior art, there are already some solutions, which can be used to reduce the amount of signalling in Gx interface and thus reduce the cost of the Gx interface.

For example, it is possible to locally define policies in the gateway. It is also possible to define the detailed policy rules in the gateway and refer to those policy rules in the Gx interface using rule identifiers such as rule base identifiers. This solution reduces the amount of parameters exchanged over the Gx interface, but it does not reduce the amount of signalling itself. Even if there are locally defined policy rules in the gateway, gateway still needs to request for PCC rules when IP-CAN bearer is established. Thus, this optimization does not actually reduce the amount of signalling or number of the concurrent Gx sessions, so it is not possible to reduce the number of PCRF nodes in the PCC infrastructure.

PCRF may provision event triggers to PCEF. As specified in 3GPP 29.212, section 4.5.3, an event trigger may be used to determine which IP-CAN session modification or specific event causes the PCEF to re-request PCC rules. Although event trigger reporting from PCEF to PCRF can apply for an IP CAN session or bearer depending on the particular event, provisioning of event triggers will be done at session level.

It is possible to disable all event triggers and thus prevent all signalling related to IP-CAN modifications. If PCRF does not get any information about the IP-CAN bearer modifications, it cannot update PCC rules based on modification to IP-CAN bearer. For some modifications, this may not be an issue, if PCC rules define how policy should be changed when e.g. roaming status or RAT changes. On the other hand, disabling all event triggers would also seriously limit the PCRF capability to control the QoS, because PCRF cannot authorize QoS modifications and it would not know what the currently applied QoS is for IP-CAN bearers. Thus, it is not feasible to disable all the event triggers. Furthermore, this solution does not reduce the amount of concurrent Gx sessions, because Gx sessions still have to be maintained until the IP-CAN bearer is terminated.

SUMMARY OF THE INVENTION

Hence, it is an object of the present invention to overcome the shortcomings of the prior art.

According to several embodiments of the present invention, a single session according to an authentication, authorization and accounting protocol, with a network element carrying out a policy and charging rule function is created, wherein the specific session may be used to manage and/or report policy and/or charging control rules.

BRIEF DESCRIPTION OF THE DRAWINGS

These and other objects, features, details and advantages will become more fully apparent from the following detailed description of embodiments which is to be taken in conjunction with the appended drawings, in which:

FIG. 6 shows a signaling flow according to an embodiment of the invention illustrating an unsolicited PUSH procedure in which special PCC rules are provided for an IP-CAN session or bearer;

FIG. 7 shows a signaling flow according to an embodiment of the invention illustrating an unsolicited PUSH procedure by which a new dedicated Diameter session (DDS) is created based on the PUSH procedure.

DETAILED DESCRIPTION OF EMBODIMENTS

In the following, description will be made to several embodiments of the present invention. It is to be understood, however, that the description is given by way of example only, and that the described embodiments are by no means to be understood as limiting the present invention thereto.

Figure 1:
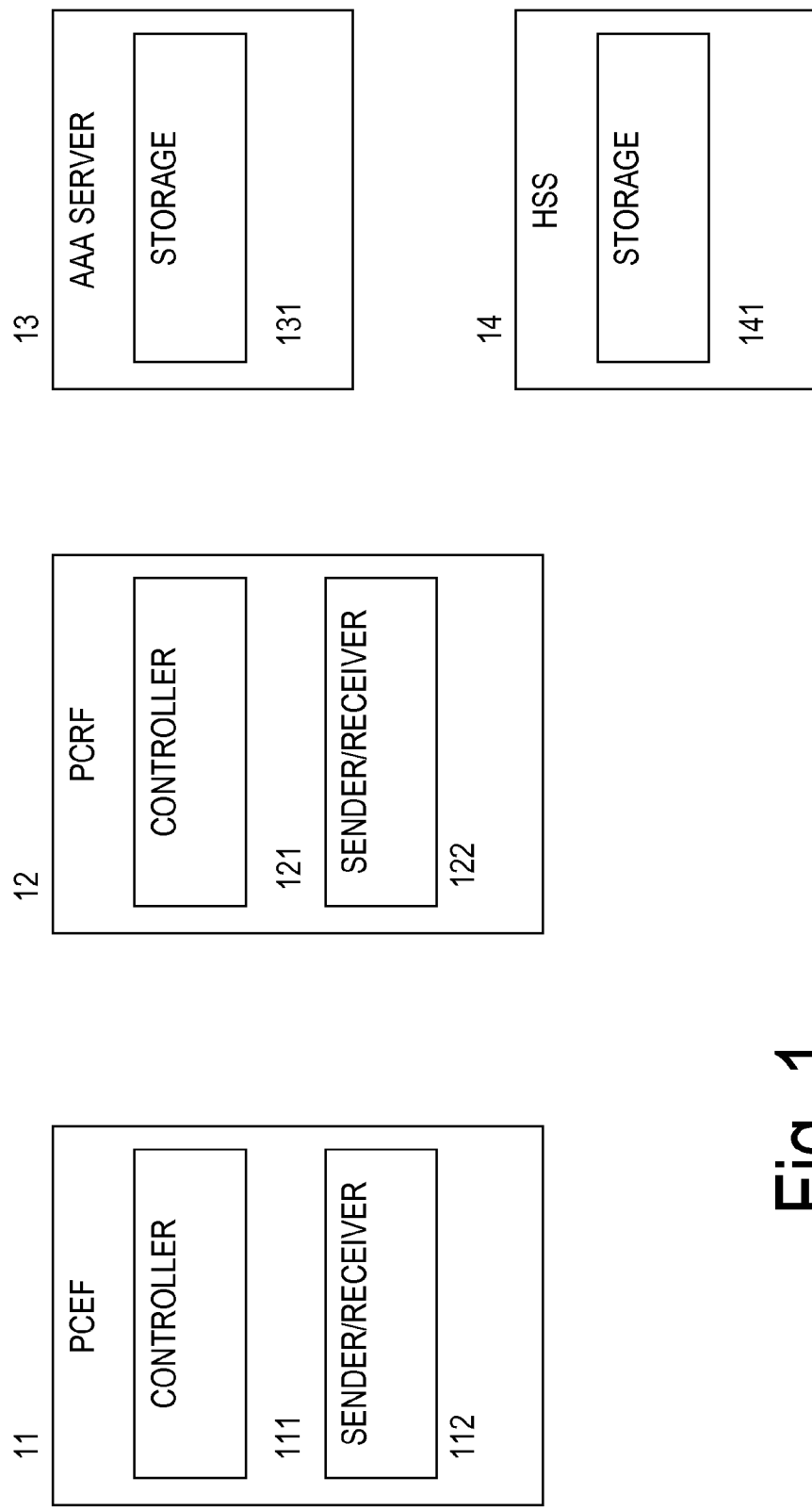
FIG. 1 shows a structure of several network elements according to an embodiment of the present invention.

FIG. 1 shows structures of the network elements as used in the embodiments described in the following.

Reference number 11 denotes a policy and charging enforcement function (PCEF) as an example for an apparatus according to the embodiments. The PCEF 11 comprises a controller 111 which might perform the overall control of the PCEF, may create Diameter sessions (as an example for authentication, authorization and accounting protocol sessions) and the like. Furthermore, the PCEF comprises a sender/receiver 112, by which messages can be received or sent. The sender/receiver may be a physical interface, a connector or the like. It may also be provided as separate receiver and sender.

Reference number 12 denotes a policy and charging rule function (PCRF) as an example for another apparatus according to the embodiments. The PCRF 12 comprises a controller 121 which might perform the overall control of the PCRF, may handle policy decisions for Diameter sessions (as an example for authentication, authorization and accounting protocol sessions) and the like. Furthermore, the PCRF comprises a sender/receiver 122, by which messages can be received or sent. The sender/receiver may be a physical interface, a connector or the like. It may also be provided as separate receiver and sender.

Furthermore, reference number 13 denotes an authentication, authorization and accounting (AAA) server comprising a storage 131, in which data related to applications are stored. Reference number 14 denotes a home subscriber server (HSS) 14 comprising a storage 141, in which subscriber and service related data are stored.

In the following, several features according to embodiments of the invention are described, which are carried out in the elements shown in FIG. 1.

- Defining a new PCEF level Gx application session in Diameter (in the following, denoted as PCEF session), which is used to manage and report policy and charging (PCC) rules over single PCEF-PCRF Diameter connection.
- Using this new PCEF session to provision default PCC rules from PCRF for all sessions managed in PCEF.
- Using AAA server in AAA interface to define whether Gx application session in Diameter needs to be created for a new IP-CAN session (in the following, denoted as dedicated Diameter session for IP-CAN bearer/session, DDS)
- Applying default PCC rules for those IP-CAN sessions, for which no DDS was initiated based on the AAA, and not invoking any Gx signaling related to those IP-CAN sessions.
- Defining in HSS whether DDS is required for a certain subscriber. When a new IP-CAN session is created, the information is passed from HSS as part of activation procedure.
- Using PCEF session for provisioning PCC trigger rules as part of default PCC rules from PCRF to PCEF. Those rules define the cases when DDS needs to be created for a new IP-CAN session even if AAA server has not requested it.
- Using unsolicited PUSH procedure over PCEF session to push special PCC rules or initiate DDS creation in those cases where default PCC rules are not sufficient for the IP-CAN session and PCEF has no other way of knowing that special PCC rules or DDS needs to be applied for the IP-CAN session.

The PCEF session according to the above-described embodiment of the invention is defined as a special Gx application session, where the target for the PCC rules is not a single IP-CAN session, but the target is the whole PCEF. Same CCR-CCA (credit control request-credit control answer) and RAR-RAA (re-authorization request-re-authorization answer) message pairs would be used to provision and manage the PCEF session. The PCEF session does not contain those attribute-value pairs (AVPs), which are used in DDS to pass information about single IP-CAN session or bearer. The AVPs, which contain the PCC rules in the PCEF session would be used as default PCC rules for all those IP-CAN sessions or bearers, for which there is no DDS. Thus, the implementation according to the above-described embodiment does not require changes to Gx application of Diameter, which would not be backward compatible or require introduction of new Diameter commands. All changes can be done by having two kinds of sessions, which can be identified based on the AVPs included in the Diameter messages.

After Diameter connection is established between Diameter peers (PCEF and PCRF), PCEF will create the PCEF session using a CCR message. The AVPs in the CCR message indicate that PCEF is creating a PCEF session and not a DDS. The first CCA message received from PCRF as response to CCR message will then define the default PCC rules for all sessions managed by PCEF based on the PCRF policy decisions. PCEF session will be terminated if the related Diameter connection is closed between PCEF and PCRF, which can be done implicitly without any actual signalling.

Backward compatibility can be achieved, because prior art PCEF will not start creating the PCEF session. If PCEF supports the invention and PCRF does not support it, PCEF will try to create PCEF session but PCRF will not comprehend the CCR message, which is visible in the status code in the CCA message given in the response message. If PCEF receives error value in CCA message, it will then know that PCRF does not support the invention and PCEF will continue working using prior art Gx procedures.

When PCEF session is active, by default no DDS is created when a new IP-CAN session is created. New DDS is created only if

- Local rules in PCEF define the event conditions when a new DDS is required. Following event conditions can be defined:
  - DDS is created if dedicated IP-CAN bearer is requested
  - DDS is created if a certain Traffic Class is requested (e.g. Traffic Class requiring real-time quality of service (QoS))
  - DDS is created if a certain quality of service class identifier (QCI) is requested
  - DDS is created in roaming condition
  - DDS is created if there is active traffic in the related IP-CAN bearer.
  - DDS is created when there is traffic matching a certain flow, i.e. subscriber is accessing a certain service over IP-CAN bearer, where default PCC rules are not sufficient.
- PCRF can define additional rules in addition to the local rules in PCEF for determining when DDS needs to be created. There can be different sets of locally configured rules in PCEF for different PCRF instances, and PCRF can indicate the required set of rules when it provisions the default PCC rules as the PCEF session is created.
- AAA server indicates that DDS is needed. This can be implemented by defining a new attribute in AAA interface, which indicates when the DDS is needed. This attribute is returned when authentication response is received from AAA server. This approach can be used only for those IP-CAN sessions, where authentication from AAA server is required. No new signalling is required if this approach is used, so there is no negative effect on the performance.
- HSS indicates whether DDS is required for a certain subscriber. This information is passed from the HSS via e.g. a mobility management entity (MME) or a serving GPRS support node (SGSN) to a serving gateway (S-GW) or a gateway GPRS support node (GGSN) using a new IE in the related GPRS tunnelling protocol (GTP) requests. Again, this approach requires no new signalling, so there is no negative effect on performance.

If DDS is created based on some event condition, the DDS is deleted when the event condition no longer applies. This also means that DDS may be created and deleted multiple times during the IP-CAN bearer lifetime. If event condition is to create DDS only when there is active traffic, then always-on functionality is defined for Gx interface, which means that DDSs are not maintained for idle IP-CAN bearers.

DDS will be always deleted if related IP-CAN bearer is deleted if DDS has not been deleted before.

Figure 2:
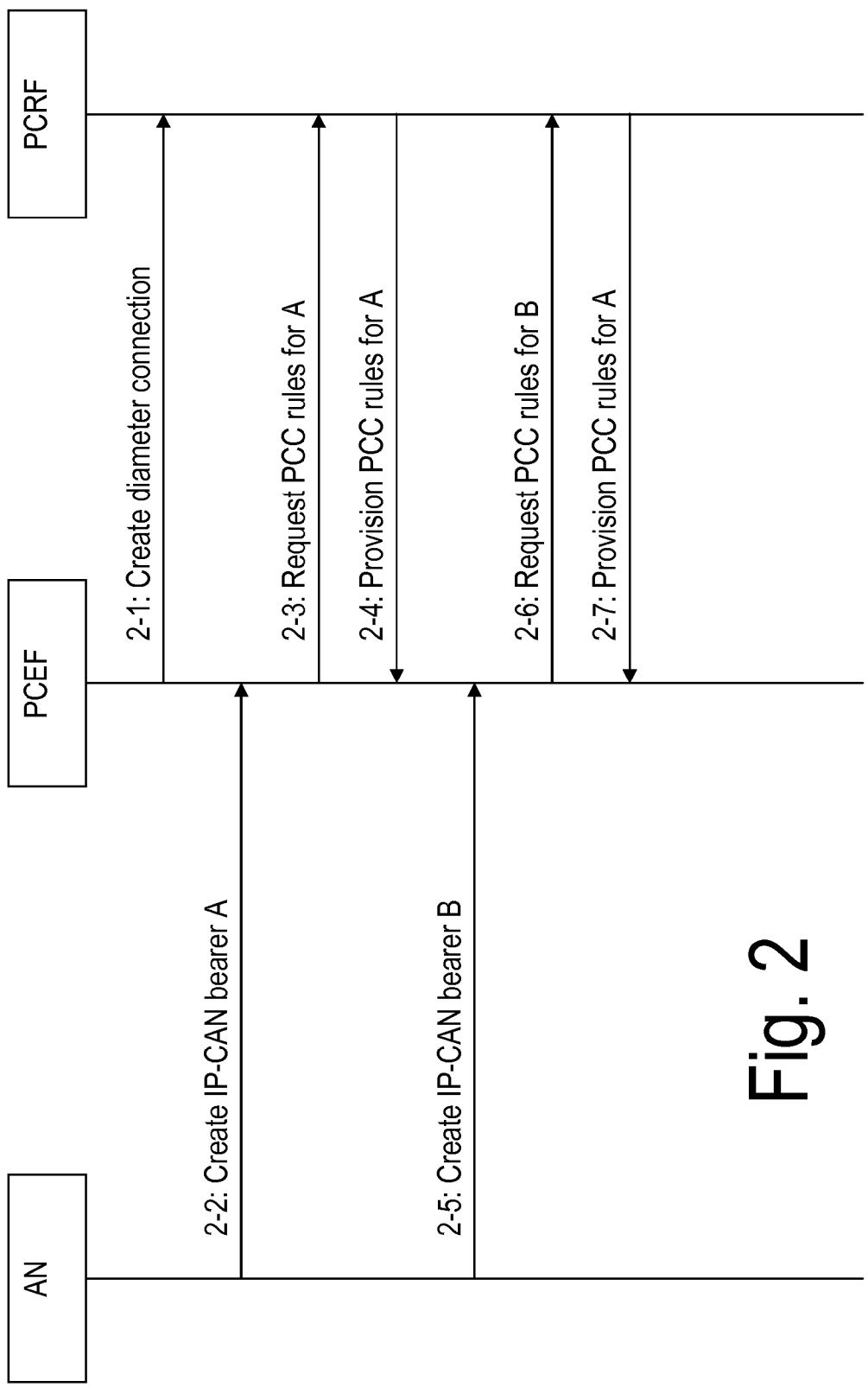
FIG. 2 shows a signaling flow of a comparative example which illustrates providing of PCC rules upon creating IP-CAN bearers according to the prior art.

As a comparative example, FIG. 2 shows a simplified message sequence diagram related to the prior art implementation. The diagram uses generalized message names between the access network (AN) (which represents e.g. MME or SGSN) and PCEF (which represents e.g. S-GW, P-GW or GGSN), and between PCEF and PCRF.

In message 2-1, a Diameter connection between the PCEF and the PCRF is created. Then, in message 2-2 from the access network to the PCEF it is indicated that a first IP-CAN bearer A is created. In response to this, the PCEF requests PCC rules for A from the PCRF in message 2-3, and the PCRF answers with the corresponding PCC rules in message 2-4. In message 2-5 from the access network to the PCEF it is indicated that a second IP-CAN bearer B is created. In response to this, the PCEF requests PCC rules for B from the PCRF in message 2-6, and the PCRF answers with the corresponding PCC rules in message 2-7.

Figure 3:
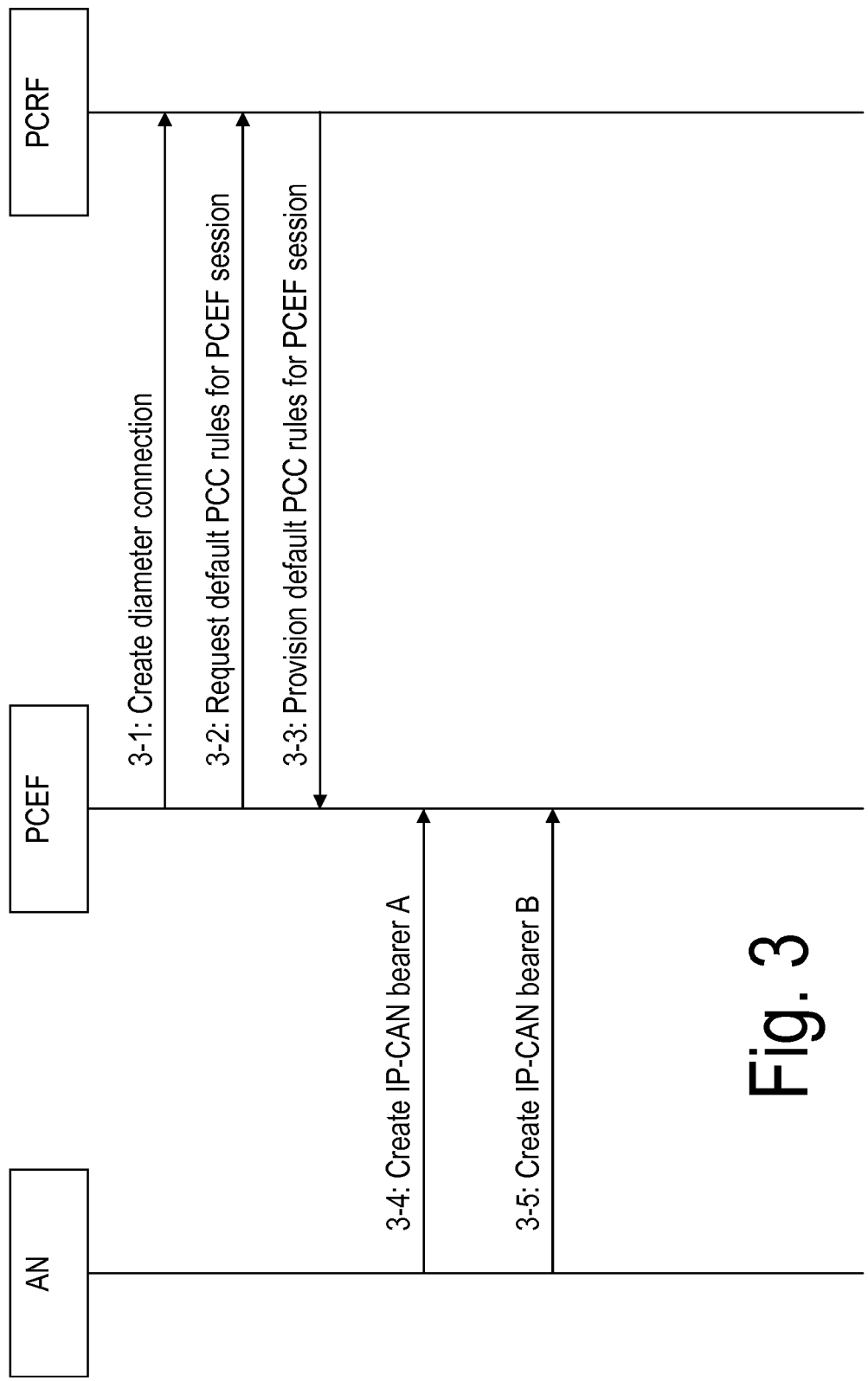
FIG. 3 shows a signaling flow according to an embodiment of the invention which illustrates signaling flow upon creating of IP-CAN bearers.

FIG. 3 shows a signalling diagram according to an embodiment of the present invention. In particular, this diagram illustrates how the situation changes if the embodiment is applied and neither IP-CAN bearers requires usage of DDS.

In message 3-1, a Diameter connection between the PCEF and the PCRF is created. In message 3-2, the PCEF requests default PCC rules for the PCEF session described above from the PCRF, and in message 3-3, the PCRF answers with the default PCC rules. Then, in message 3-4 from the access network (AN) to the PCEF it is indicated that a first IP-CAN bearer A is created. In message 3-5, a second IP-CAN bearer B is created. Since in both cases, i.e., for IP-CAN bearers A and B, no dedicated Diameter session (DDS) has to be created, it is not necessary to request for the PCC rules individually, since the default PCC rules apply.

Thus, FIG. 3 in comparison to FIG. 2 clearly illustrates how the signalling is dramatically reduced when most or all IP-CAN bearers can be managed using the default PCC rules.

Figure 4:
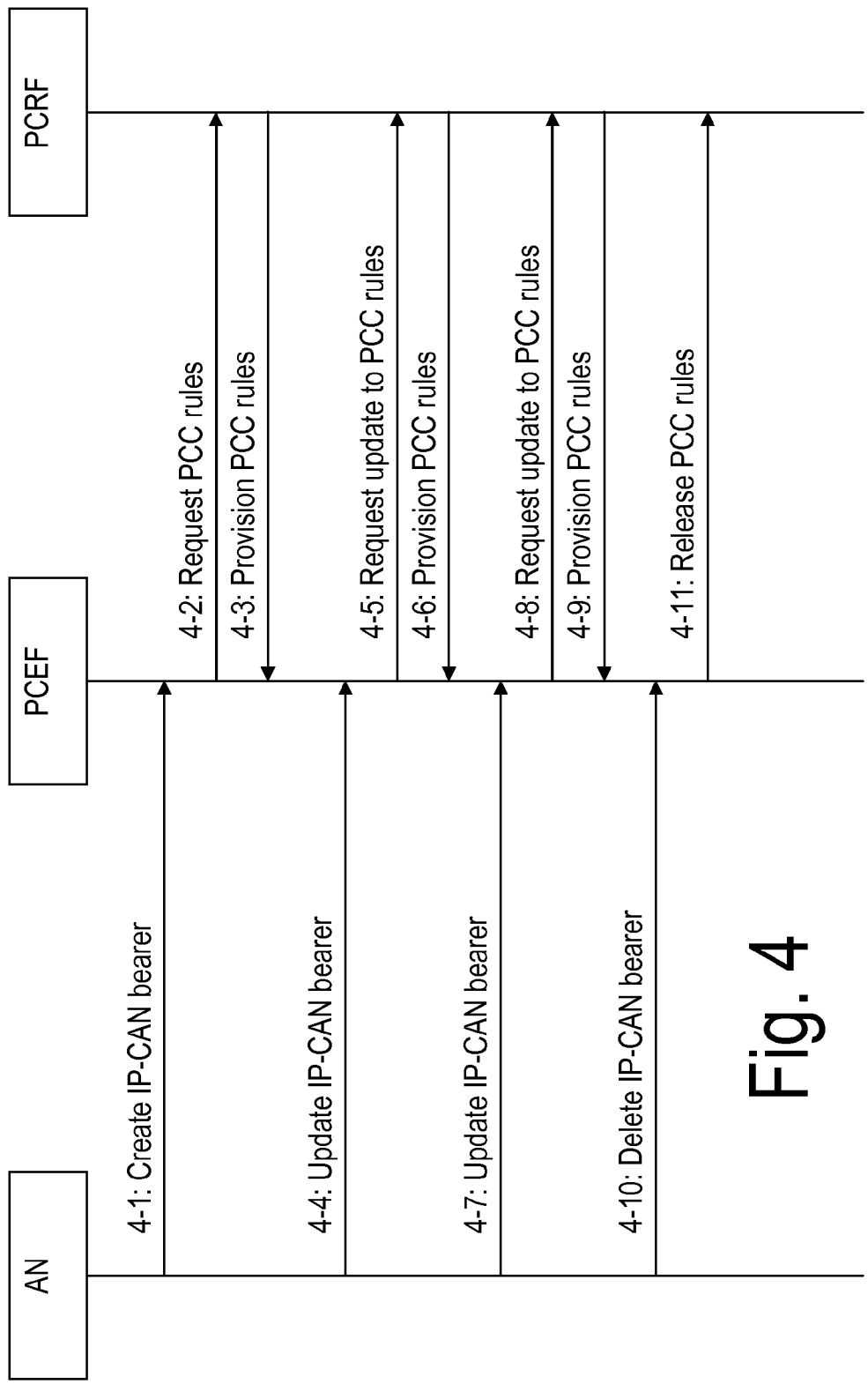
FIG. 4 shows a signaling flow of a comparative example which illustrates providing of PCC rules upon creating and updating of an IP-CAN bearer according to the prior art.

As a further comparative example, FIG. 4 shows a signalling diagram, in which it is illustrated how IP-CAN bearer updates can trigger requests for PCC rule updates in the prior art implementation.

In message 4-1 from the access network to the PCEF, it is indicated that an IP-CAN bearer is created. In response to this, the PCEF requests PCC rules for this IP-CAN bearer from the PCRF in message 4-2, and the PCRF answers with the corresponding PCC rules in message 4-3. Then, it is assumed that the IP-CAN bearer is updated, which is indicated to the PCEF in message 4-4. In this case, the PCEF has to request for an update to the PCC rules by message 4-5, and the PCRF answers with the corresponding PCC rules in message 4-6. Then, it is assumed that a further update of the IP-CAN bearer is effected, which is indicated by message 4-7. Then, the PCEF has to request for an update to the PCC rules again by message 4-8, and the PCRF answers with the PCC rules in message 4-9. Thereafter, the IP CAN bearer is deleted, which is indicated by message 4-10 to the PCEF. In response to this, the PCEF sends message 4-11 to the PCRF, in which it is indicated that the PCC rules in connection with this IP-CAN bearer are released.

Thus, even though PCRF can define that only a certain updates to IP-CAN bearer trigger PCC rule update request, the prior art implementation anyway will require that Diameter session is maintained for the IP-CAN bearer until the IP-CAN bearer is released.

Figure 5:
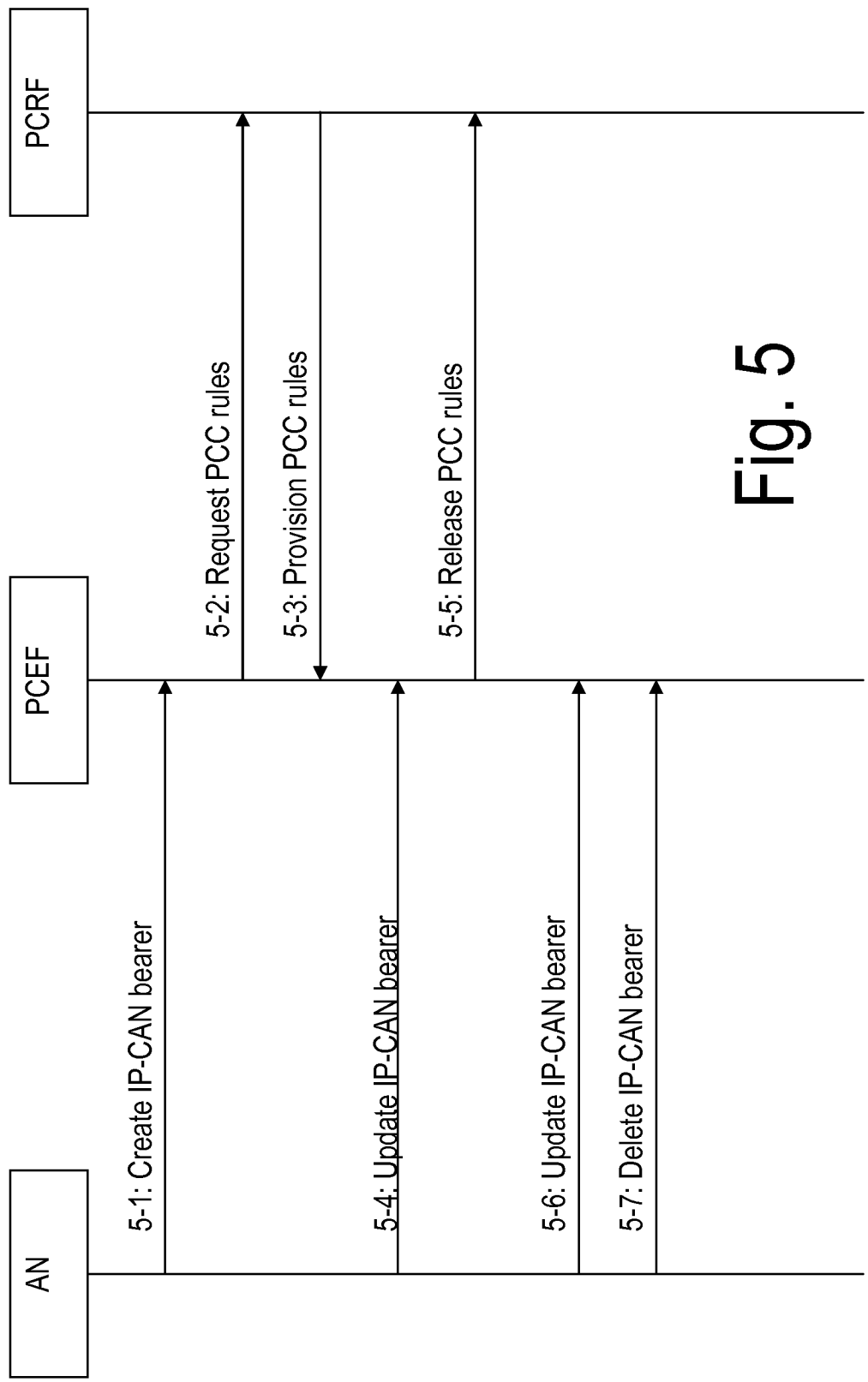
FIG. 5 shows a signaling flow according to an embodiment of the invention which illustrates signaling flow upon creating and updating of IP-CAN bearer.
Figure 8:
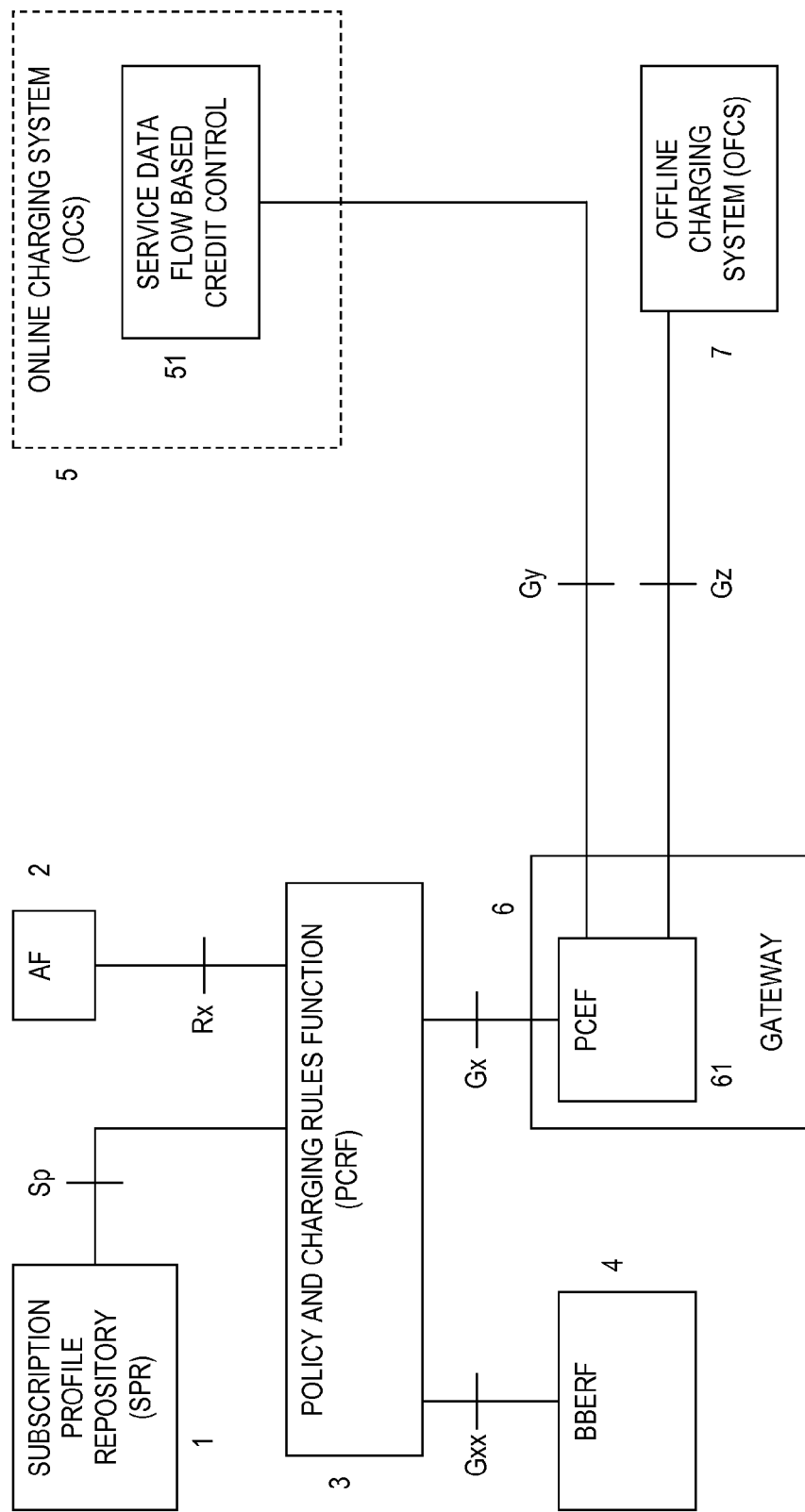
FIG. 8 shows the PCC architecture in 3GPP/SAE.

FIG. 5 shows a signalling diagram according to an embodiment of the present invention, wherein DDS is created when IP-CAN bearer is created. That is, with message 5-1 from the access network to the PCEF, it is indicated that an IP-CAN bearer is created. As mentioned above, in this example it is assumed that a DDS is necessary. Hence, with message 5-2, the PCEF requests PCC rules for this IP-CAN bearer from the PCRF, and the PCRF answers with the PCC rules in message 5-3.

After the update to IP-CAN bearer, as indicated by message 5-4, the event condition requiring DDS is no longer true and DDS is released. Thus, the PCEF sends a corresponding message 5-5 to the PCRF, by which the PCC rules for this IP-CAN bearer are released. No further Gx signalling is then performed related to the IP-CAN bearer, which again reduces the amount of signalling. Namely, as an example, in message 5-6 a further update to the IP-CAN bearer is indicated, and in message 5-7 it is indicated that the IP-CAN bearer is deleted. No signalling between the PCEF and the PCRF in connection with these events is necessary.

In the following, it is described how a PUSH procedure can be used according to embodiments of the invention to provide an unsolicited request for creating DDS for IP-CAN session. This does not reduce the signalling in Gx interface itself, but it is useful to guarantee that PCRF can control any IP-CAN session if there is a need for it even if DDS is not created when the IP-CAN session is created. This procedure may be used e.g. in situation where AF detects that some special PCC rules need to be applied for IP-CAN session, such as the case where AF is SIP server and a dedicated IP-CAN bearer needs to be created with a certain guaranteed bit rate. AF can then inform PCRF that it needs to provide special PCC rules to PCEF. PCRF will then use unsolicited PUSH procedure over PCEF session. This procedure can be implemented e.g. using RAR message and AVPs, which identify the related IP-CAN session. If there is no need to create DDS, i.e. PCRF simply gives some special PCC rules for a certain IP-CAN session and PCRF has no need to know more about the IP-CAN session or provide any other PCC rules in the future, then special PCC rules can be passed in the same RAR message. If DDS needs to be created, then RAR message identifies the IP-CAN session, and PCEF will then request the PCC rules for the IP-CAN session. FIGS. 6 and 7 illustrate these two different scenarios.

In particular, FIG. 6 shows an unsolicited PUSH where special PCC rules are provided for some active IP-CAN session or bearer.

By message 6-1, the application function (AF) indicates to the PCRF that special PCC rules are required. This, by message 6-2, the PCRF sends an unsolicited PUSH including the special PCC rules for the IP-CAN bearer or session to the PCEF. Hence, the PCEF has the PCC rules available.

FIG. 7 shows an unsolicited PUSH where a new DDS is created based on the PUSH procedure. By message 7-1, the application function (AF) indicates to the PCRF that a DDS should be created. In message 7-2, the PCRF sends an unsolicited PUSH to the PCEF, in which it is indicated that a DDS has to be created for the IP-CAN bearer or session. By message 7-3, the PCEF creates the DDS and requests the PCC rules for this case, and in message 7-4, the PCRF sends the PCC rules to the PCEF.

As described above and illustrated in the signalling diagrams, it should be clear that an advantage of embodiments of the present invention is the reduced signalling in Gx interface, which provides cost savings for operators. Less PCRF nodes are required in the network, because there will be less active Diameter sessions. This reduces the network complexity and maintenance costs. The benefits are based on the fact that for most IP-CAN bearers, there is no need to have DDS, because the default PCC rules should be sufficient in most cases. Even if DDS is required every time when there is traffic, the DDS can be enabled only if there is active traffic and thus the idle sessions will not require DDS and in many cases most of the IP-CAN bearers are idle.

As an example, if 10% of the IP-CAN bearers require special PCC rules and PCEF supports 5 million IP-CAN bearers, the above described embodiments reduce the number of Gx application sessions to 500001 (500000 DDS sessions and 1 PCEF session). That is, with respect to the example described in the introductory part of the present specification, according to which an example gateway can have 5 million concurrent sessions, so that according to the prior art, at least 9 PCRF products are required to have 5 million concurrent sessions of single gateway, according to embodiments of the present invention, only one PCRF per each PCEF is required.

The embodiments described above are not limited to the Diameter protocol. It can be applied to any other suitable protocol, in particular any authentication, authorization and accounting protocol.

Moreover, the embodiments may also be applied to other network elements than PCEF and PCRF, and are also not limited to the Gx interface. That is, the embodiments may be applied to any network elements in which policy and/or charging rules or the like are managed or handled.

In the following, several embodiments of the invention are described in generic terms by referring to several aspects thereof.

According to a first aspect of several embodiments of the invention, an apparatus is provided which comprises a controller configured to create a single session according to an authentication, authorization and accounting protocol with a network element carrying out a policy and charging rule function. The specific session may be used to manage and/or report policy and/or charging control rules.

The first aspect may be modified as follows:

The apparatus may further comprise a receiver for receiving default policy and charging control rules from network element carrying out a policy and/or charging rule function by using the single session.

The controller may be configured to check whether a dedicated session according to an authentication, authorization and accounting protocol is to be created, and to apply the default policy and/or charging control rules only for a session which is not a dedicated session.

Moreover, the controller may be configured to perform the check by referring to information of a specific network control element.

The specific network control element may be configured to store subscriber information in which it is specified whether a dedicated session is to be created for a subscriber.

The information may be received during an activation procedure of an access network session.

The specific network control element may be a home subscriber server (e.g., HSS), and the access network session may be an internet protocol connectivity access network (e.g., IP-CAN) session.

The specific network control element may be configured to store application information in which it is specified whether a dedicated session is to be created based on the application.

This specific network control element may be an authentication, authorization and accounting (e.g., AAA) server.

The specific network control element may also be the network element carrying out a policy and/or charging rule function, wherein information whether a dedicated session is to be created for a session may be included in the default policy and/or charging control rules.

Moreover, the controller may be configured to receive an unsolicited push procedure via the specific session in order to receive special policy and/or charging control rules and/or to initiate a dedicated session.

According to a second aspect of embodiments of the invention, an apparatus is provided which comprises a controller configured to receive a single session according to an authentication, authorization and accounting protocol with a network element carrying out a policy and charging enforcement function, wherein the specific session is used to manage and/or report policy and/or charging control rules.

The second aspect may be modified as follows:

The apparatus may further comprise a sender configured to send default policy and/or charging control rules to the network element carrying out a policy and charging rule function with the single session.

The sender may be configured to send information whether a dedicated session is to be created for a session to the network element carrying out a policy and/or charging rule function.

Furthermore, the sender may be configured to send the information with the default policy and/or charging control rules.

The sender may be configured to send an unsolicited push procedure to the network element carrying out a policy and/or charging rule function in order to receive special policy and charging control rules and/or to initiate a dedicated session.

According to a third aspect of several embodiments of the invention, an apparatus is provided which comprises a storage in which application related data are stored, wherein the application related data comprises information whether a dedicated session according to an authentication, authorization and accounting protocol is to be created.

The above apparatus may be an authentication, authorization and accounting server (e.g., AAA).

According to a fourth aspect of several embodiments of the invention, an apparatus is provided which comprises a storage in which subscriber related data are stored, wherein the subscriber related data comprises information whether a dedicated session according to an authentication, authorization and accounting protocol is to be created.

The above apparatus may further comprise a sender configured to send the information during an activation procedure of an access network session. Moreover, the apparatus may be a home subscriber server (e.g., HSS).

According to a fifth aspect of several embodiments of the invention, an apparatus is provided which comprises means for creating a single session according to an authentication, authorization and accounting protocol with a network element carrying out a policy and charging rule function, wherein the specific session may be used to manage and/or report policy and/or charging control rules.

The fifth aspect may be modified as follows:

The apparatus may further comprise means for receiving default policy and charging control rules from network element carrying out a policy and/or charging rule function by using the single session.

The apparatus may further comprise means for checking whether a dedicated session according to an authentication, authorization and accounting protocol is to be created, and means for applying the default policy and/or charging control rules only for a session which is not a dedicated session.

Moreover, the apparatus may comprise means for performing the check by referring to information of a specific network control element.

Furthermore, the specific network control element may comprise means for storing subscriber information in which it is specified whether a dedicated session is to be created for a subscriber.

The information may be received during an activation procedure of an access network session.

Moreover, the specific network control element may be a home subscriber server (e.g., HSS), and the access network session may be an internet protocol connectivity access network (e.g., IP-CAN) session.

The specific network control element may comprise means for storing application information in which it is specified whether a dedicated session is to be created based on the application.

This specific network control element may be an authentication, authorization and accounting (e.g., AAA) server.

The specific network control element may also be the network element carrying out a policy and/or charging rule function, wherein information whether a dedicated session is to be created for a session may be included in the default policy and/or charging control rules.

Moreover, the apparatus may comprise means for receiving an unsolicited push procedure via the specific session in order to receive special policy and/or charging control rules and/or to initiate a dedicated session.

According to a sixth aspect of embodiments of the invention, an apparatus is provided which comprises means for receiving a single session according to an authentication, authorization and accounting protocol with a network element carrying out a policy and charging enforcement function, wherein the specific session is used to manage and/or report policy and/or charging control rules.

The sixth aspect may be modified as follows:

The apparatus may further comprise means for sending default policy and/or charging control rules to the network element carrying out a policy and charging rule function with the single session.

The apparatus may comprise means for sending information whether a dedicated session is to be created for a session to the network element carrying out a policy and/or charging rule function.

Furthermore, the apparatus many comprise means for sending the information with the default policy and/or charging control rules.

The apparatus may comprise means for sending an unsolicited push procedure to the network element carrying out a policy and/or charging rule function in order to receive special policy and charging control rules and/or to initiate a dedicated session.

According to a seventh aspect of several embodiments of the invention, an apparatus is provided which comprises means for storing application related data, wherein the application related data comprises information whether a dedicated session according to an authentication, authorization and accounting protocol is to be created.

The above apparatus may be an authentication, authorization and accounting server (e.g., AAA).

According to an eight aspect of several embodiments of the invention, an apparatus is provided which comprises means for storing subscriber related data, wherein the subscriber related data comprises information whether a dedicated session according to an authentication, authorization and accounting protocol is to be created.

The above apparatus may further comprise means for sending the information during an activation procedure of an access network session. Moreover, the apparatus may be a home subscriber server (e.g., HSS).

According to a ninth aspect of several embodiments of the invention, a method is provided which comprises creating a single session according to an authentication, authorization and accounting protocol with a network element carrying out a policy and charging rule function, wherein the specific session is used to manage and/or report policy and/or charging control rules.

The ninth aspect may be modified as follows:

The method may further comprise receiving default policy and charging control rules from network element carrying out a policy and/or charging rule function by using the single session.

The method may further comprise checking whether a dedicated session according to an authentication, authorization and accounting protocol is to be created, and applying the default policy and/or charging control rules only for a session which is not a dedicated session.

The check may be performed by referring to information of a specific network control element.

In the specific network control element, subscriber information may be stored in which it is specified whether a dedicated session is to be created for a subscriber.

The method may further comprise receiving the information during an activation procedure of an access network session.

The specific network control element may be a home subscriber server, and the access network session may be an internet protocol connectivity access network session.

In the specific network control element, application information may be stored in which it is specified whether a dedicated session is to be created based on the application.

The specific network control element described above may be an authentication, authorization and accounting server.

The specific network control element may also be the network element carrying out a policy and/or charging rule function, wherein information whether a dedicated session is to be created for a session is included in the default policy and/or charging control rules.

The method may further comprise receiving an unsolicited push procedure via the specific session in order to receive special policy and/or charging control rules and/or to initiate a dedicated session.

According to a tenth aspect of several embodiments of the invention, a method is provided which comprises receiving a single session according to an authentication, authorization and accounting protocol from a network element carrying out a policy and charging enforcement function, wherein the specific session is used to manage and/or report policy and/or charging control rules.

The tenth aspect may be modified as follows:

The method may further comprise sending default policy and/or charging control rules to the network element carrying out a policy and charging rule function with the single session.

The method may further comprise sending information whether a dedicated session is to be created for a session to the network element carrying out a policy and/or charging rule function.

The method may further comprise sending the information described above with the default policy and/or charging control rules.

The method may further comprise sending an unsolicited push procedure to the network element carrying out a policy and/or charging rule function in order to receive special policy and charging control rules and/or to initiate a dedicated session.

According to an eleventh aspect of several embodiments of the invention, the method may further comprise storing application related data, wherein the application related data comprises information whether a dedicated session according to an authentication, authorization and accounting protocol is to be created.

This method may be carried out by an authentication, authorization and accounting server.

According to a twelfth aspect of several embodiments of the invention, a method is provided which comprises storing subscriber related data, wherein the subscriber related data comprises information whether a dedicated session according to an authentication, authorization and accounting protocol is to be created.

This method may further comprise sending the information during an activation procedure of an access network session.

The method may be carried out by a home subscriber server.

According to a thirteenth aspect of several embodiments of the invention, a method is provided which comprises creating, in a network node, a single session according to an authentication, authorization and accounting protocol with a network element carrying out a policy and charging rule function, wherein the specific session is used to manage and/or report policy and/or charging control rules.

The thirteenth aspect may be modified as follows:

The method may further comprise receiving, by the network node, default policy and charging control rules from network element carrying out a policy and/or charging rule function by using the single session.

The method may further comprise checking, in the network node, whether a dedicated session according to an authentication, authorization and accounting protocol is to be created, and applying the default policy and/or charging control rules only for a session which is not a dedicated session.

The check may be performed by referring to information of a specific network control element.

In the specific network control element, subscriber information may be stored in which it is specified whether a dedicated session is to be created for a subscriber.

The method may further comprise receiving, by the network node, the information during an activation procedure of an access network session.

The specific network control element may be a home subscriber server, and the access network session may be an internet protocol connectivity access network session.

In the specific network control element, application information may be stored in which it is specified whether a dedicated session is to be created based on the application.

The specific network control element described above may be an authentication, authorization and accounting server.

The specific network control element may also be the network element carrying out a policy and/or charging rule function, wherein information whether a dedicated session is to be created for a session is included in the default policy and/or charging control rules.

The method may further comprise receiving, by the network node, an unsolicited push procedure via the specific session in order to receive special policy and/or charging control rules and/or to initiate a dedicated session.

The network node described above may be a network element carrying out a policy and/or charging enforcement function.

According to a fourteenth aspect of several embodiments of the invention, a method is provided which comprises receiving, by a network node, a single session according to an authentication, authorization and accounting protocol from a network element carrying out a policy and charging enforcement function, wherein the specific session is used to manage and/or report policy and/or charging control rules.

The fourteenth aspect may be modified as follows:

The method may further comprise sending, by the network node, default policy and/or charging control rules to the network element carrying out a policy and/or charging rule function with the single session.

The method may further comprise sending, by the network node, information whether a dedicated session is to be created for a session to the network element carrying out a policy and/or charging rule function.

The method may further comprise sending, by the network node, the information described above with the default policy and/or charging control rules.

The method may further comprise sending, by the network node, an unsolicited push procedure to the network element carrying out a policy and/or charging rule function in order to receive special policy and charging control rules and/or to initiate a dedicated session.

The method described above may be carried out by a network element carrying out a policy and/or charging enforcement function.

According to a fifteenth aspect of several embodiments of the invention, the method may further comprise storing application related data in a network control element, wherein the application related data comprises information whether a dedicated session according to an authentication, authorization and accounting protocol is to be created.

The network control element may be an authentication, authorization and accounting server.

According to a sixteenth aspect of several embodiments of the invention, a method is provided which comprises storing subscriber related data in a network control element, wherein the subscriber related data comprises information whether a dedicated session according to an authentication, authorization and accounting protocol is to be created.

This method may further comprise sending the information during an activation procedure of an access network session.

The network control element described above may be a home subscriber server.

According to a seventeenth aspect, a computer program product may be provided, which comprises code means for performing a method as defined in any of the above ninth to sixteenth aspect and its modifications when run on a processing means or module.

For the purpose of the present invention as described herein above, it should be noted that method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of PCRF, PCEF etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

What is described above is what is presently considered to be preferred embodiments of the present invention. However, as is apparent to the skilled reader, these are provided for illustrative purposes only and are in no way intended that the present invention is restricted thereto. Rather, it is the intention that all variations and modifications be included which fall within the spirit and scope of the appended claims.

The invention claimed is:

1. An apparatus comprising:
at least one processor; and
at least one memory including computer program code,
the at least one memory and the computer program code configured, with the at least one processor, to cause the apparatus at least to:
create a single session according to an authentication, authorization and accounting protocol with a network element carrying out a policy and/or charging rule function, wherein a specific session is used to manage and/or report policy and/or charging control rules;
request default policy and/or charging control rules from the network element;
receive default policy and/or charging control rules from the network element carrying out the policy and/or charging rule function by using the single session;

receive a message from an access network relating to the creation of an internet-protocol-connectivity-access-network bearer;
determine whether the creation of the internet-protocol-connectivity-access-network bearer creates a dedicated session; and
apply the received default policy and/or charging control rules only if the creation of the internet-protocol-connectivity-access network is determined to not create a dedicated session.

2. The apparatus according to claim 1, wherein the apparatus is further caused to perform the determining by referring to information of a specific network control element.

3. The apparatus according to claim 2, wherein the specific network control element is configured to store subscriber information in which it is specified whether a dedicated session is to be created for a subscriber.

4. The apparatus according to claim 3, wherein the information is received during an activation procedure of an access network session.

5. The apparatus according to claim 3, wherein the specific network control element is a home subscriber server, and the access network session is an internet protocol connectivity access network session.

6. The apparatus according to claim 2, wherein the specific network control element is configured to store application information in which it is specified whether a dedicated session is to be created based on the application.

7. The apparatus according to claim 6, wherein the specific network control element is an authentication, authorization and accounting server.

8. The apparatus according to claim 2, wherein the specific network control element is the network element carrying out a policy and/or charging rule function, wherein information whether a dedicated session is to be created for a session is included in the default policy and/or charging control rules.

9. The apparatus according to claim 1, wherein the apparatus is further caused to receive an unsolicited push procedure via the specific session in order to receive special policy and/or charging control rules and/or to initiate a dedicated session.

10. An apparatus comprising:
at least one processor;
and at least one memory including computer program code,
the at least one memory and the computer program code configured, with the at least one processor, to cause the apparatus at least to:
receive a single session according to an authentication, authorization and accounting protocol with a network element carrying out a policy and charging enforcement function, wherein a specific session is used to manage and/or report policy and/or charging control rules;
receive a request for default policy and/or charging control rules from the network element;
send default policy and/or charging control rules to the network element carrying out the policy and charging enforcement function with the single session, wherein the network element determines whether a creation of an internet-protocol-connectivity-access network bearer creates a dedicated session; and
transmit policy and/or charging control rules, different from the default policy and/or charging control rules, only if the network element determines that the creation of the internet-protocol-connectivity-access network bearer creates a dedicated session.

11. The apparatus according to claim 10, wherein the sending comprises sending information whether a dedicated session is to be created for a session to the network element carrying out the policy and charging enforcement function.

12. The apparatus according to claim 11, wherein the sending comprises sending the information with the default policy and/or charging control rules.

13. The apparatus according to claim 10, wherein the sending comprises sending an unsolicited push procedure to the network element carrying out the policy and charging enforcement function in order to receive special policy and charging control rules and/or to initiate a dedicated session.

14. A method comprising:
creating a single session according to an authentication, authorization and accounting protocol with a network element carrying out a policy and/or charging rule function, wherein a specific session is used to manage and/or report policy and/or charging control rules;
requesting default policy and/or charging control rules from the network element;
receiving default policy and/or charging control rules from the network element carrying out the policy and/or charging rule function by using the single session;
receiving a message from an access network relating to the creation of an internet-protocol-connectivity-access-network bearer;
determining whether the creation of the internet-protocol-connectivity-access-network bearer creates a dedicated session; and
applying the received default policy and/or charging control rules only if the creation of the internet-protocol-connectivity-access network is determined to not create a dedicated session.

15. The method according to claim 14, wherein the determining is performed by referring to information of a specific network control element.

16. The method according to claim 15, wherein in the specific network control element subscriber information is stored in which it is specified whether a dedicated session is to be created for a subscriber.

17. The method according to claim 16, comprising receiving the information during an activation procedure of an access network session.

18. The method according to claim 17, wherein the specific network control element is a home subscriber server, and the access network session is an internet protocol connectivity access network session.

19. The method according to claim 15, wherein in the specific network control element application information is stored in which it is specified whether a dedicated session is to be created based on the application.

20. The method according to claim 19, wherein the specific network control element is an authentication, authorization and accounting server.

21. The method according to claim 15, wherein the specific network control element is the network element carrying out a policy and/or charging rule function, wherein information whether a dedicated session is to be created for a session is included in the default policy and/or charging control rules.

22. The method according to claim 14, further comprising receiving an unsolicited push procedure via the specific session in order to receive special policy and/or charging control rules and/or to initiate a dedicated session.

23. A computer program product comprising code, stored on a non-transitory computer-readable medium, for performing a method according to claim 14 when run on a computer processor.

24. A method comprising:
- receiving a single session according to an authentication, authorization and accounting protocol from a network element carrying out a policy and charging enforcement function, wherein a specific session is used to manage and/or report policy and/or charging control rules;
- receiving a request for default policy and/or charging control rules from the network element;
- sending default policy and/or charging control rules to the network element carrying out the policy and charging enforcement function with the single session, wherein the network element determines whether a creation of an Internet-protocol-connectivity-access network bearer creates a dedicated session; and
- transmitting policy and/or charging control rules, different from the default policy and/or charging control rules, only if the network element determines that the creation of the internet-protocol-connectivity-access network bearer creates a dedicated session.

25. The method according to claim 24, wherein the sending comprises sending information whether a dedicated session is to be created for a session to the network element carrying out the policy and charging enforcement function.

26. The method according to claim 25, wherein the sending comprises sending the information with the default policy and/or charging control rules.

27. The method according to claim 24, wherein the sending comprises sending an unsolicited push procedure to the network element carrying out the policy and charging enforcement function in order to receive special policy and charging control rules and/or to initiate a dedicated session.

\* \* \* \* \*